(12) United States Patent
Chapman (10) Patent No.: US 12,449,892 B2
(45) Date of Patent: Oct. 21, 2025

(54) SYSTEM AND METHOD FOR CONSERVING MEMORY SPACE IN AN ONLINE VIRTUAL RELAY AMONG MULTIPLE PARTICIPANTS

(71) Applicant: Darius Chapman, Blackwood (AU)

(72) Inventor: Darius Chapman, Blackwood (AU)

(*) Notice: Subject to any disclaimer, the term of this patent is extended or adjusted under 35 U.S.C. 154(b) by 401 days.

(21) Appl. No.: 17/926,932

(22) PCT Filed: May 21, 2021

(86) PCT No.: PCT/AU2021/050483
§ 371 (c)(1),
(2) Date: Nov. 21, 2022

(87) PCT Pub. No.: WO2021/232112
PCT Pub. Date: Nov. 25, 2021

(65) Prior Publication Data
US 2023/0195211 A1    Jun. 22, 2023

Related U.S. Application Data

(60) Provisional application No. 63/028,533, filed on May 21, 2020.

(51) Int. Cl.
*G06F 3/01* (2006.01)
*G06N 3/02* (2006.01)
(52) U.S. Cl.
CPC ............... *G06F 3/011* (2013.01); *G06N 3/02* (2013.01)
(58) Field of Classification Search
CPC ..... G07C 1/24; A63B 21/285; A63B 2220/62; A63B 24/0062; A63B 24/0084; G06Q 10/06
See application file for complete search history.

(56) References Cited

U.S. PATENT DOCUMENTS 10,991,168 B2    4/2021    Martin
2020/0054922 A1   2/2020    Azaria et al.
2020/0372725 A1  11/2020    Martin

FOREIGN PATENT DOCUMENTS

WO    2019/079818 A1    4/2019

OTHER PUBLICATIONS

RunGuides media—"Virtual Baton App" http://www.runguidesmedia.com/virtual-baton-app/ Whole Document.
(Continued)

*Primary Examiner* — Lawrence S Galka
(74) *Attorney, Agent, or Firm* — McDonald Hopkins LLC (57) ABSTRACT

A system and method for determining when relay participant data is to be stored in a database in order to conserve memory space in the database. The method includes logging a participant as completing a designated leg if the participant completed the designated predetermined leg distance within the predetermined time window, the logging including recording data into the database regarding a distance and time the participant completed the designated leg, otherwise not recording the participant's data in the database if either the predetermined distance was not completed, or the predetermined distance was not completed within the predetermined time window. Upon determining that the participant successfully completed the predetermined distance within the predetermined time window, the method includes notifying the next participant on the relay team that their time window has commenced to complete their predetermined distance.

19 Claims, 4 Drawing Sheets

(56) References Cited

OTHER PUBLICATIONS

RunGuides media—"Speed Werk Relay" https://speedwerkrelay.com/ Whole Document.

Cision PR Newswire—Mizuno's Mobile "Baton" App Allows Runners to Turn Miles Into Dollars in Support of "Back on My Feet"—published May 19, 2014 [retrieved from internet on Jul. 20, 2021] <URL: https://www.prnewswire.com/news-releases/mizunos-mobile-baton-app-allowsrunners-to-turn-miles-into-dollars-in-support-of-back-on-my-feet-259772411.html>.

TeamFit—running und HIIT training for teams, friends and partner [retrieved from internet on Jul. 22, 2021] <URL: - https://web.archive.org/web/20191203180925/https://www.teamfit.eu/en/> published on Dec. 3, 2019 as per Wayback Machine Whole Document.

Patent Cooperation Treaty—Written Opinion of the International Searching Authority—International Application No. PCT/AU2021/050483 [Date of mailing: Jul. 30, 2021] International Patent Classification (IPC) or both national classification and IPC G07C 1/24(Jan. 2006) A63K 3/00(Jan. 2006).

Patent Cooperation Treaty International Search Report—International Application No. PCT/AU2021/050483 [Date of the actual completion of the international search: Jul. 30, 2021] [Date of mailing of the international search report: Jul. 30, 2021].

SYSTEM AND METHOD FOR CONSERVING MEMORY SPACE IN AN ONLINE VIRTUAL RELAY AMONG MULTIPLE PARTICIPANTS

This application is a Section 371 national stage application and claims the benefit of and/or priority to International Application No. PCT/AU2021/050483 entitled "SYSTEM AND METHOD FOR CONSERVING MEMORY SPACE IN AN ONLINE VIRTUAL RELAY AMONG MULTIPLE PARTICIPANTS" filed May 21, 2021. The International Application No. PCT/AU2021/050483 claims the benefit and/or priority to the U.S. Provisional Patent Application No. 63/028,533 entitled "SYSTEM AND METHOD FOR CONSERVING MEMORY SPACE IN AN ONLINE VIRTUAL RELAY AMONG MULTIPLE PARTICIPANTS" filed May 21, 2020. The entireties of the above-noted applications are incorporated by reference herein.

FIELD OF THE INVENTION

The present disclosure relates generally to a system and method for the conservation of memory space in situations involving online relay competitions.

BACKGROUND OF THE INVENTION

Conventional systems permit for participants to upload their data to a centralised database. The volumes of data being stored can be tremendous, which can cause the system to become inefficient with lower response times between the database and any device being used by the person uploading the data.

In a situation involving an online relay competition, responsiveness is important since it can directly affect the outcome of the relay competition. Participants will be irate if they are unable to begin their leg due to responsiveness at the platform end. Or worse, if results are inaccurate, it can create a negative environment amongst participants, and greatly affect an event organiser's reputation.

The present description seeks to disclose a platform and method in one or more embodiments that lessen these problems by how memory space is consumed in an online relay competition environment. Streamlining the allocation of memory space increases efficiency in the online environment, leading to better outcomes in an online relay competition.

It will be clearly understood that, if a prior art publication is referred to herein, this reference does not constitute an admission that the publication forms part of the common general knowledge in the art in Australia or in any other country.

SUMMARY

The present invention in one preferred aspect provides for a diverse location system for facilitating exercise coordination among multiple remotely located participants in an online exercise competition. The system includes a database configured to store identification details of a plurality of participants in the competition; and a processor configured to receive participant data from a GPS-enabled exercise device configured to record at least distance, time and location of an exercise activity of the participant. The processor is further configured to identify the participant associated with said GPS device, and determine whether the participant completed a predetermined distance within a predetermined window of time. The processor is further configured to store the participant data in said database if the participant completed the predetermined distance within the predetermined time window, otherwise not recording the participant data in the database if the participant did not complete either the predetermined distance within the predetermined time window in order to minimize memory usage. Upon determining the participant completed the predetermined distance within the predetermined time window, the processor sends an electronic communication to another participant associated with the participant.

In another preferred aspect, the present disclosure provides a method for determining when relay participant data is stored in a database in order to conserve memory space in the database. The method includes entering a relay competition into an online server system, the relay competition including at least two relay legs, each leg having a predetermined distance that must be completed within a predetermined time window; registering, with the online server, a team of participants in the online relay, the registering including providing a unique participant identification for each participant; logging a participant as completing a designated leg if the participant completed the designated predetermined leg distance within the predetermined time window, the logging including recording data into the database regarding a distance and time the participant completed the designated leg, otherwise not recording the participant's data in the database if either the predetermined distance was not completed, or the predetermined distance was not completed within the predetermined time window; and upon determining that the participant successfully completed the predetermined distance within the predetermined time window, notifying the next participant on the relay team that their time window has commenced to complete their predetermined distance.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers, but does not exclude the inclusion of one or more further integers.

It will be appreciated that reference herein to "preferred" or "preferably" is intended as exemplary only.

The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

DETAILED DESCRIPTION OF THE DRAWINGS

Reference will now be made in detail to the present preferred embodiments of the invention, examples of which are illustrated in the accompanying drawings.

Figure 1:
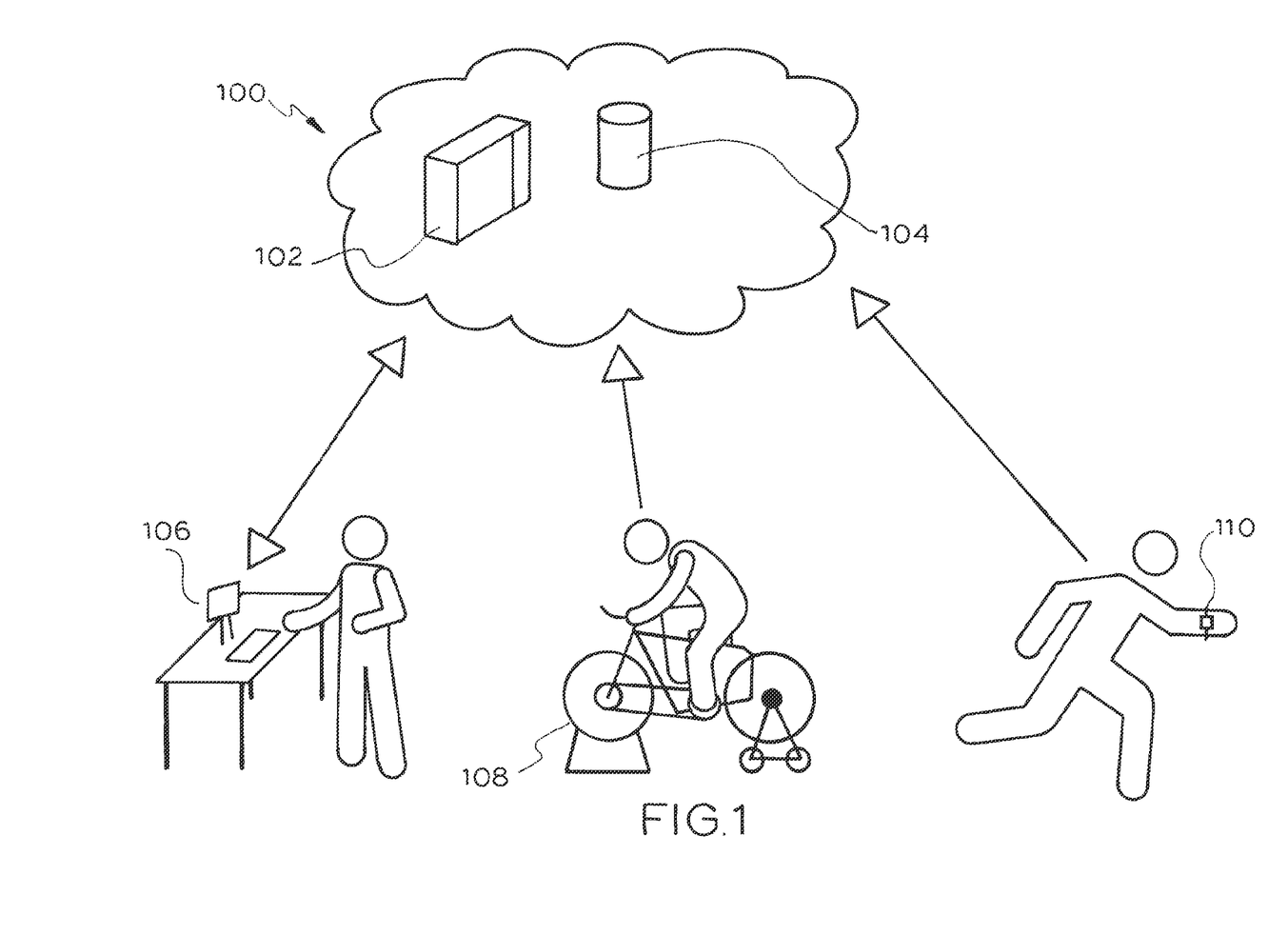
FIG. 1 is a schematic view of a diverse location system for facilitating exercise coordination among multiple remotely located participants in an online exercise competition in accordance with a preferred embodiment of the present disclosure.

FIG. 1 shows a preferred embodiment of a diverse location system 100 for facilitating exercise coordination among multiple remotely located participants in an online exercise competition. System 100 includes a processor 102 in communication with a server and database 104. The system is preferably in wireless communication with at least one workstation 106, bike trainer 108, and a mobile exercise tracker, such as GPS watch 110. In use, a participant registers for an online relay competition through workstation 106, then participates in an online relay competition using one or more exercise tracking devices, such as bike trainer 108 and/or GPS watch 110. Upon conclusion of the participant's leg of their relay, an electronic baton is passed to the next relay participant until all legs are concluded within a predetermined timeframe. System 100 is configured to operate in a manner that conserves memory usage. The preferred elements of system 100 and their interrelationship are described below.

Referring to FIG. 1, system 100 is preferably a cloud-based server platform that includes processor 102 and database 104. It will be appreciated that processor 102 and/or database 104 may be physically located in a remote location where desired for security reasons. System 100 is useable with workstation 106, which may be a laptop computer, desktop computer, or any convenient computing device normally used to interact with online systems in a substantive way. System 100 is further preferably useable with bike trainer 108, and GPS watch 110.

Bike trainer 108 is preferably configured to measure at least speed and distance. Preferably, trainer 108 is configured to further measure cadence, power (wattage), and heart rate, while tracking total distance. More advanced bike trainers will be configured with resistance capability to simulate hills. If the trainer is a smart trainer with wireless communications (e.g., Bluetooth and/or Wi-Fi), then simulated rides may take place over a course having an undulating profile, where resistance will simulate an elevation climb or descent. Viewing over the simulated course may be displayed on a suitable viewer (the user's own tablet or smartphone, or a display such as a computer monitor or television). Wireless communications also may be configured to transmit data from the trainer to the online platform to record data as the ride is performed.

GPS watch 110 preferably includes one or more sensors configured to measure heartrate. GPS watch will track a user's location, speed and distance while the user is exercising. Upon conclusion of the exercise segment, the user may stop the exercise segment on the watch, and upload the data to the online platform to record the data. The exercise data may be transferred to the platform as the user exercises, depending upon the particular GPS watch and need for any ancillary devices such as a nearby smartphone with telecommunications capabilities should GPS watch 110 not be configured with telecommunications capabilities itself.

System 100 may further be configured for use with personal exercise tracking devices, even for use in the water. For example only, many GPS watches are water-resistant and can be used to track users or participants in the open water with swimming or rowing. It is even possible to utilise swim goggles configured with GPS capabilities and tracking. It will be appreciated that a wide variety of exercise devices may be configured with tracking capabilities, and communications capabilities to effectively track a participant during exercise.

Referring again to FIG. 1, in an online relay environment, processor 102 is preferably configured to receive participant data from a GPS watch 110 to record distance, time and location of an exercise activity of the participant, identify the participant, and determine whether the participant completed the predetermined distance within a predetermined time window. For example, if a relay participant is supposed to complete their relay leg of 10K (6.2 miles) within a predetermined time window of 2 days commencing at the start of a relay competition, or for commencing from the conclusion of a relay leg immediately preceding the participant's leg, using time data from the participant's exercise data, along with distance data from the participant's exercise tracker will permit processor 102 to determine if the participant completed their relay leg within the minimum distance and time constraints put in place by an event organiser.

Where an online relay competition is to be conducted over undulating terrain, the processor 102 may be configured to utilise data collected by bike trainer 108 from a plurality of participants, or configured to utilise data collected by an onboard bike computer, or a combination of both where the online competition is organised to utilise multiple forms of tracking (stationary or in-motion, e.g., a bike trainer vs. using a bicycle on the road).

Processor 102 is preferably configured to first determined whether the participant completed the predetermined distance, and/or completed the predetermined distance within the predetermined time window. If one or both conditions are not met (e.g., not completing the required distance, or not completing the distance in the allocated time), then the participant's exercise data is not recorded in database 104 to save memory space. This is in contrast to conventional exercise platforms where all exercise data is uploaded and stored, consuming a large volume of memory. Processor 102 is therefore beneficially configured to efficiently utilise existing memory capacity, which increases overall processing speeds and responsiveness since the processor does not have to search through a large volume of data, much of which may be irrelevant.

Once processor 102 determines that the participant completed their designated leg within the predetermined time window, the participant's exercise data is recorded in database 104. Processor 102 may then send an electronic communication to a subsequent relay participant that their predetermined time window has commenced in which they need to complete their predetermined distance. This is effectively like "passing a baton" in a real relay. The electronic communication may take a variety of forms as desired, for example, SMS, text, and/or an e-mail.

Figure 2:
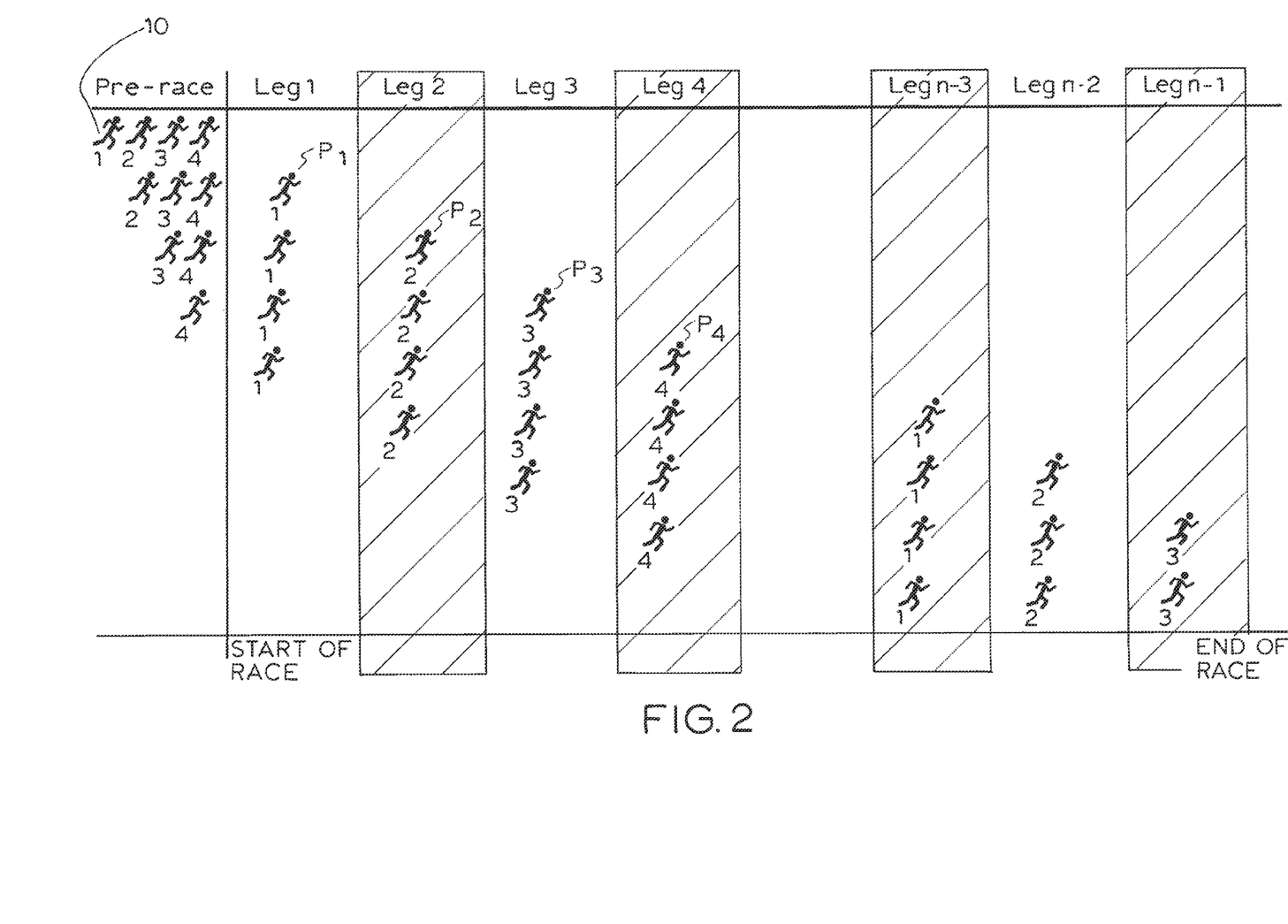
FIG. 2 is a schematic representation of a relay team participating through multiple legs of a competition.

Having described the preferred components of system 100, a preferred method 200 of use will now be described with reference to FIGS. 2 to 4. FIG. 2 shows a schematic of a relay team 10 having a plurality of participants $P_1$, $P_2$, $P_3$, and $P_4$. As each team member completes a leg of the race, the next team member is passed an electronic baton (described in further detail below). This continues until the last team member successfully completes their designated leg within a predetermined time window.

Figure 3:
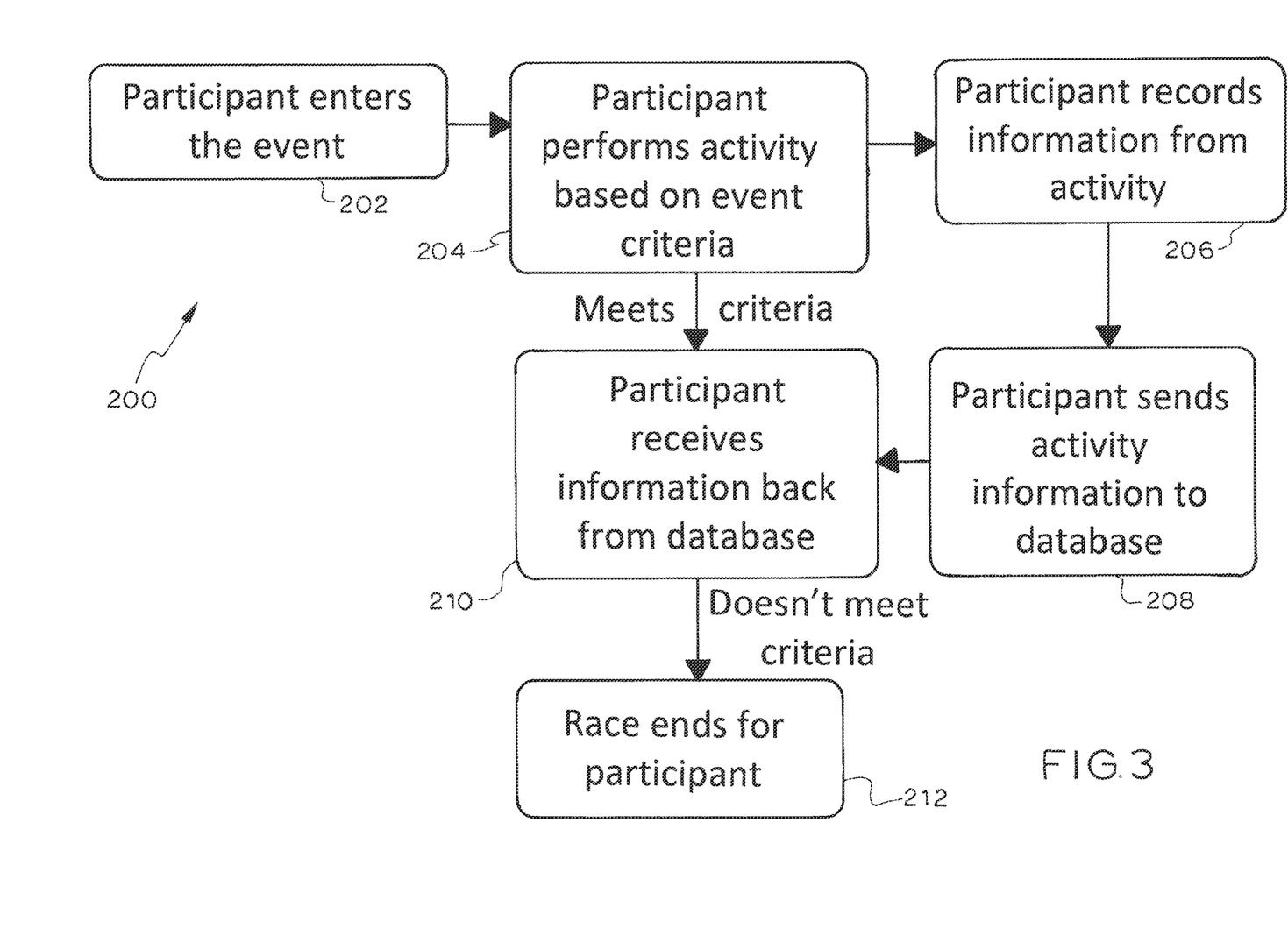
FIG. 3 is a flow chart of a participant interaction with the system of FIG. 1 in accordance with an embodiment of the present disclosure.

Referring to FIGS. 1 and 3, a participant enters an online event by registering their details into the online platform in step 202, In step 204, the participant performs their activity based on the event criteria, using, for example, predetermined leg time duration and leg distance or length. In step 206, the participant exercise data is recorded, usually by their GPS tracking device, such as GPS watch 110 or bike trainer 108. In step 208, the participant sends or uploads their exercise activity data to database 104, either through workstation 106 or automatically through their exercise tracker (without a local smart phone or local computer), or both. In Step 210, the participant receives confirmation from processor 102 and database 104 that either they met the predetermined requirements to "pass a baton" or complete the leg, or does not meet the predetermined requirements. If they do not meet the predetermined requirements either time-based and/or distance, then in step 212, the race ends for that particular participant.

Figure 4:
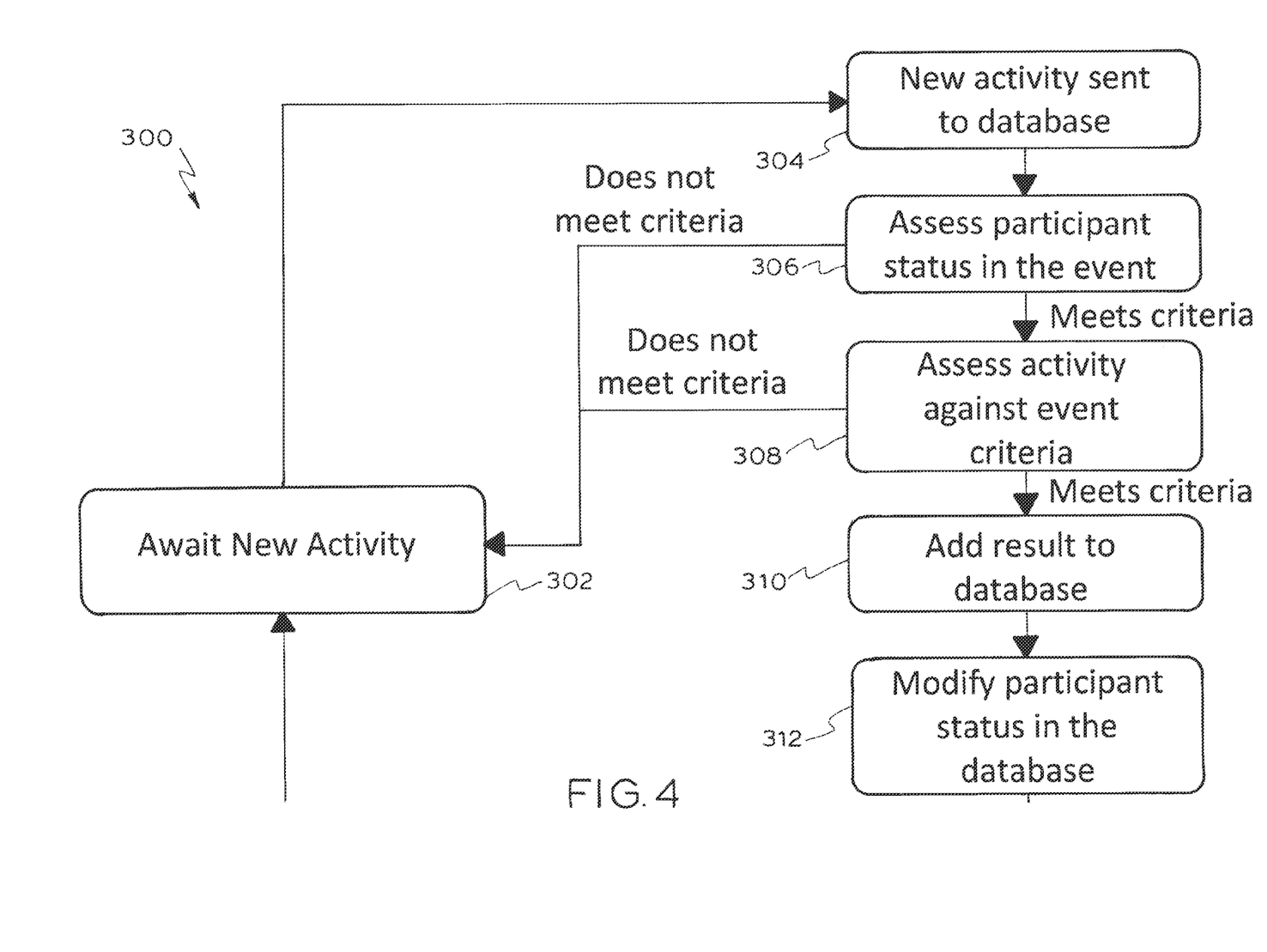
FIG. 4 is a flow chart of a platform operation with a participant using the system of FIG. 1 in accordance with an embodiment of the present disclosure.

Referring now to FIGS. 1 and 4, a platform operation or method 300 of the use of system 100 will now be described. In step 302, processor 102 awaits the upload of data of a new activity. The exercise data will preferably include a unique participant identifier. In step 304, the new activity data is sent (e.g., uploaded) to database 104. Processor 102 in step 306 accesses participant status in the event (e.g., they are the proper participant, they are registered for the event and leg, etc.). If the participant does not have a proper status, then the method returns to step 302. If the participant does have the proper status, then the method proceeds to step 308, where the participant's activity is assessed against predetermined criteria (e.g., time duration and/or distance), If the participant's activity data does not meet the threshold predetermined criteria, then the method returns to step 302. If the participant's activity data meets the threshold predetermined criteria, then in step 310, the participant's result is added to database 104, Thereafter, in step 312, the participant's status is modified in database 104 to "completed leg" (or similar), and processor 102 passes the "electronic baton" to the next relay participant, or if the last relay leg is being assessed, then upon successful completion of the last leg, the relay competition is completed for the relay team. The relay team's overall results are compared to the results of other relay teams in the competition, and an overall champion is determined and crowned.

It will be appreciated that the steps described above may be performed in a different order, varied, or some steps omitted entirely without departing from the scope of the present description.

EXAMPLE 1

Marathon Relay

As an example of the general system and method in use, let us say Joe Smith registers for an online marathon relay. He is the team leader, and organises a team of 5 participants into the Sunshine Coast Striders. The event organiser, Sunshine Coast virtual relays, preconfigures the competition so that each relay leg is 8.4 kilometres. The event organiser further preconfigures the competition so that each leg must be completed within a one-day time duration window.

Joe is designated to complete leg 2 of the relay. The online competition commences at a predetermined common start time, and each team fields their starting runner. The starting runner has one day to complete their 8.4K run. The Sunshine Coast Striders start their leadoff leg at 11 pm at night (the marathon relay started at midnight the night prior). The leadoff leg has 1 hour to complete her leg. If she takes 1 hour and 5 minutes to complete her 8.4K leg, then she has exceeded the predetermined time threshold, and her effort is not recorded in the results. Alternatively, if the leadoff relay runner suffers a leg cramp 5K into the run, and does not complete the predetermined distance of 8.4K, then her results are not recorded in the database. If the relay participant does not meet the predetermined criteria (distance and/or time), then the relay team is dropped or disqualified without recording their results. Alternatively, the system may be configured so that the team is simply penalised with a time penalty of, for example, an extra 60 minutes to be added onto the relay's overall finish time (the combined time of each relay team members actual timed run). It will be appreciated that the penalty, where the competition has penalties, can include requiring a relay team member to run two legs, where only one leg will count. It will be appreciated that there are various ways to award a penalty to ensure fairness of a competition, or a relay team may simply be disqualified.

EXAMPLE 2

Ultra Marathon

A runner forms a team and registers online to compete. A running sequence is set for that team during the registration process. When the competition starts (i.e. on the start-date), an algorithm for the system sets a "baton" flag for the first runner in the sequence and begins a countdown timer for 48 hours. When the 'baton' flag is set for the runner, an automated SMS, e-mail, SMS or other notification is sent to the runner to notify them they have baton, and they have 48 hours to run. The runner uses a GPS enabled device to run at least 5K (or whatever the nominated race-distance is). Run legs may be of the same length for each relay member, or of different lengths for one or more team members.

Once they have completed their run, they upload the GPS file to a database (for all the runners in the competition) and label that run with a particular code so that the result is identified, along with their unique personal identification (i.e., name, or pseudonym). The GPS data contains the time, duration, speed and distance of the run. The algorithm searches the GPS database when new runs are loaded.

When a new run has been loaded, the algorithm searches for key "filter" data to determine if that run should be included as part of the relay race. Information includes identifiers like name/pseudonym, and/or a title label.

If the "run" passes the filters, the GPS and unique ID data is then analyzed by the algorithm to determine if they are in the competition, and if they are currently the "baton" holder for their team. If the uploaded run passes the filters and the participant did hold the baton, the GPS data is then stored and analyzed for distance, time, duration, elevation, etc. The algorithm then searches another master database of participants to find the team that the runner is in and adds the key GPS data to that runner's team total.

After the run-data is added to the team total, the algorithm then un-sets the "baton" flag for that runner, identifies the next runner in the team, and then sets the "baton" flag for the next runner and the SMS is sent and the whole sequence begins again. The race finishes when each team reaches a pre-defined goal distance (i.e., 250 Ks) or a time-limit is reached (i.e., 1 Month).

If the runner does not complete their "leg" in the 48 hour window, the team is awarded a penalty. Runners can "buy" their way out of running if they do not want to run, via a fully automated system. It will be understood that the makeup of particular algorithm referred to above would be understood by a person of ordinary skill in the art given the context of this description, and for simplicity, is not detailed herein.

One or more embodiments of the system and method described herein may be configured to utilise elements of artificial intelligence to determine a person's likelihood of entering additional relay competitions, or identifying prospective relay participants. For example only, a classifier on the online server may be used to determine the participant's likelihood of entering another relay competition, the classifier utilising a neural network in combination with historical competition participation patterns of the participant. The classifier on the online server may be used to determine an identity of a prospective relay partner of the relay participant, the classifier utilising a neural network in combination with demographical data the participant, the demographical data including the participant's location. The details of artificial intelligence in this context would be appreciated by a person of ordinary skill in the field, and for simplicity, is not repeated herein.

The foregoing description is by way of example only, and may be varied considerably without departing from the scope of the present invention. For example only, the system and method may be adapted for use in a running relay, a triathlon relay, a duathlon relay, a swimming relay, a bike relay, or indeed, a wide variety of sporting; competitions such as rowing, weight lifting, or other sports. Even non-traditional competitions such as scavenger hunts involving teams can utilise aspects of the system and method described herein.

The features described with respect to one embodiment may be applied to other embodiments, or combined with or interchanged with the features of other embodiments, as appropriate, without departing from the scope of the present disclosure.

The system and method in a preferred form provides the advantages of conserving memory space, increasing processor efficiency, and reducing wasted time compared to conventional systems and methods.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A method for determining when relay participant data is stored in a database in order to conserve memory space in the database, comprising:
   entering a relay competition into an online server system, the relay competition including at least two relay legs, each leg having a predetermined distance that must be completed within a predetermined time window;
   registering, with the online server, a team of participants in the relay competition, the registering including providing a unique participant identification for each participant;
   logging a participant as completing a designated leg if the participant completed the predetermined distance within the predetermined time window, the logging including recording data into the database regarding a distance and time the participant completed the designated leg, otherwise not recording the participant's data in the database if either the predetermined distance was not completed, or the predetermined distance was not completed within the predetermined time window, the logging including uploading exercise data from a GPS-enabled device carried by the participant during exercise, the exercise data including a unique participant identifier; and
   upon determining that the participant successfully completed the predetermined distance within the predetermined time window, notifying the next participant on a relay team that their time window has commenced to complete their predetermined distance.

2. The method of claim 1, wherein the relay competition is a running competition.

3. The method of claim 1, wherein the relay competition is a cycling competition.

4. The method of claim 1, wherein the relay competition is a swimming competition.

5. The method of claim 1, wherein the relay competition is a triathlon competition.

6. The method of claim 1, wherein the relay competition is a duathlon competition.

7. The method of claim 1, wherein the notification sent to the next participant is provided as at least one of a text message, an e-mail, and/or a SMS.

8. The method of claim 1, wherein the exercise data is directly uploaded through a Wi-Fi network to the server without a local smartphone or local computer.

9. The method of claim 1, wherein the exercise data includes exercise duration, leg completion time, participant speed, and leg distance.

10. The method of claim 1, further comprising using a classifier on the online server to determine an identity of a prospective relay partner of the relay participant, the classifier utilising a neural network in combination with demographical data the participant, the demographical data including the participant's location.

11. A diverse location system for facilitating exercise coordination among multiple remotely located participants in an online exercise competition, comprising:
   a database configured to store identification details of a plurality of participants in the competition; and
   a processor configured to:
      receive participant data from a GPS-enabled exercise device configured to record at least distance, time and location of an exercise activity of the participant;
      identify the participant associated with said GPS device;
      determine whether the participant completed a predetermined distance within a predetermined window of time;
      store the participant data in said database if the participant completed the predetermined distance within the predetermined time window, otherwise not recording the participant data in the database if the participant did not complete either the predetermined distance within the predetermined time window in order to minimize memory usage; and
      upon determining the participant completed the predetermined distance within the predetermined time window, said processor sending an electronic communication to another participant associated with the participant.

12. The system of claim 11, further comprising a notification sent to the other participant is provided as at least one of a text message, an e-mail, and/or an SMS.

13. The system of claim 11, wherein the online exercise competition is an online relay.

14. The system of claim 13, wherein the online relay is at least one of a run, a triathlon, and a duathlon.

15. The system of claim 11, wherein the participant data from the GPS exercise device includes at least exercise duration, leg completion time, participant speed, and leg distance.

16. The system of claim 11, wherein said processor includes a classifier configured to determine a participant's likelihood of entering another relay competition, the classifier utilising a neural network in combination with historical competition participation patterns of the participant.

17. The system of claim 11, wherein said processor includes a classifier configured to determine an identity of a prospective relay partner of the participant, the classifier utilising a neural network in combination with demographical data the participant, the demographical data including the participant's location.

18. The system of claim 11, wherein the electronic communication is a virtual baton to be passed to a subsequent relay participant in an online relay.

19. A method for determining when relay participant data is stored in a database in order to conserve memory space in the database, comprising:
- entering a relay competition into an online server system, the relay competition including at least two relay legs, each leg having a predetermined distance that must be completed within a predetermined time window;
- registering, with the online server, a team of participants in the relay competition, the registering including providing a unique participant identification for each participant;
- logging a participant as completing a designated leg if the participant completed the designated predetermined distance within the predetermined time window, the logging including recording data into the database regarding a distance and time the participant completed the designated leg, otherwise not recording the participant's data in the database if either the predetermined distance was not completed, or the predetermined distance was not completed within the predetermined time window;
- upon determining that the participant successfully completed the predetermined distance within the predetermined time window, notifying the next participant on a relay team that their time window has commenced to complete their predetermined distance; and
- using a classifier on the online server to determine a participant's likelihood of entering another relay competition, the classifier utilising a neural network in combination with historical competition participation patterns of the participant.

* * * * *